(12) United States Patent
Gehrer et al.

(10) Patent No.: US 12,189,767 B2
(45) Date of Patent: Jan. 7, 2025

(54) SYSTEM AND METHOD FOR INTRUSION DETECTION ON A PHYSICAL LEVEL USING AN INTERNAL ANALOG TO DIGITAL CONVERTER

(71) Applicant: Robert Bosch GmbH, Stuttgart (DE)

(72) Inventors: Stefan Gehrer, Pittsburgh, PA (US); Jorge Guajardo Merchan, Pittsburgh, PA (US); Shalabh Jain, Pittsburgh, PA (US)

(73) Assignee: Robert Bosch GmbH (DE)

( * ) Notice: Subject to any disclaimer, the term of this patent is extended or adjusted under 35 U.S.C. 154(b) by 222 days.

(21) Appl. No.: 17/032,624

(22) Filed: Sep. 25, 2020

(65) Prior Publication Data

US 2022/0100853 A1   Mar. 31, 2022

(51) Int. Cl.
*G06F 21/56* (2013.01)
*G06F 21/70* (2013.01)

(52) U.S. Cl.
CPC .............. *G06F 21/56* (2013.01); *G06F 21/70* (2013.01); *G06F 2221/033* (2013.01); *G06F 2221/034* (2013.01)

(58) Field of Classification Search
CPC ....... G06F 21/50–568; G06F 21/70–77; G06F 2221/033–034
See application file for complete search history.

(56) References Cited

U.S. PATENT DOCUMENTS

| | | | |
|---|---|---|---|
| 10,157,278 B2 | 12/2018 | Aguayo Gonzalez et al. | |
| 10,338,145 B2 | 7/2019 | Katrak | |
| 10,685,118 B2 * | 6/2020 | Prowell | G06F 1/28 |
| 2004/0268159 A1 * | 12/2004 | Aasheim | G06F 1/3203 |
| | | | 713/300 |
| 2015/0317475 A1 * | 11/2015 | Aguayo Gonzalez | G06F 21/755 |
| | | | 726/23 |
| 2018/0173877 A1 | 6/2018 | Guri et al. | |

OTHER PUBLICATIONS

Clark, Shane S., et al. "{WattsUpDoc}: Power Side Channels to Nonintrusively Discover Untargeted Malware on Embedded Medical Devices." 2013 USENIX Workshop on Health Information Technologies (HealthTech 13). 2013. (Year: 2013).*

(Continued)

*Primary Examiner* — Madhuri R Herzog
(74) *Attorney, Agent, or Firm* — Dickinson Wright PLLC

(57) ABSTRACT

A system that includes memory and a microcontroller including an analog-to-digital converter (ADC) and in communication with the memory. The microcontroller is configured to define a fingerprint that includes a baseline measurement of side-channel traces of a side-channel retrieved from the ADC, during an enrollment period of the system, wherein the enrollment period includes measuring voltage prior to runtime operation, receive a runtime measurement from the ADC that includes voltage of at least the separate microcontroller during runtime, compare the runtime measurement to the fingerprint, and in response to the measurement exceeding a threshold, executing a countermeasure operation against software ran by the separate processor.

20 Claims, 4 Drawing Sheets

(56) References Cited

OTHER PUBLICATIONS

S. Braun and P. Russer, "Measurements of spurious emission with a time-domain EMI measurement system using multi-sampling techniques," 2006 IEEE International Symposium on Electromagnetic Compatibility, 2006. EMC 2006., 2006, pp. 792-795, doi: 10.1109/ISEMC.2006.1706418. (Year: 2006).*

V. V. Gadde, H. Awano and M. Ikeda, "An Encryption-Authentication Unified A/D Conversion Scheme for IoT Sensor Nodes," 2018 IEEE Asian Solid-State Circuits Conference (A-SSCC), 2018, pp. 123-126, doi: 10.1109/ASSCC.2018.8579273. (Year: 2018).*

Khalid, Faiq, et al. "Behavior profiling of power distribution networks for runtime hardware trojan detection." 2017 IEEE 60th International Midwest Symposium on Circuits and Systems (MWSCAS). IEEE, 2017. (Year: 2017).*

"ADC12662 12-Bit, 1.5 MHZ, 200 mW A/D Converter with Input Multiplexer and Sample/Hold" by Texas Instruments. Apr. 2013 (Year: 2013).*

Jain et al., "Physical Layer Group Key Agreement for Automotive Controller Area Networks", in Cryptographic Hardware and Embedded Systems—CHES 2016—18th International Conference, ser. LNCS, B. Gierlichs and A. Y. Poschmann, Eds., vol. 9813. Springer, Aug. 17-19, 2016, 20 pages.

O'Flynn et al., "On-Device Power Analysis Across Hardware Security Domains." IACR Transactions on Cryptographic Hardware and Embedded Systems, vol. vol. 2019, Aug. 2019, 28 pages.

Gnad et al., "Leaky Noise: New Side-Channel Attack Vectors in Mixed-Signal IoT Devices," IACR Transactions on Cryptographic Hardware and Embedded Systems, vol. vol. 2019,May 2019, 35 pages.

HC16 MC68CK16Z User's Manual, Freescale Semiconductor Inc., 2004, 500 pages.

* cited by examiner

SYSTEM AND METHOD FOR INTRUSION DETECTION ON A PHYSICAL LEVEL USING AN INTERNAL ANALOG TO DIGITAL CONVERTER

TECHNICAL FIELD

The present disclosure relates to security of a computer system, such as a vehicle computer system or other type of system.

BACKGROUND

Modern automotive in-vehicle networks present a large attack surface from a security point of view, due to both the amount of Electrical Control Units (ECUs) and their connectivity to external networks. Detecting a malicious intrusion into such networks is an integral part of automotive security to prevent or at least lower the impact of attacks.

SUMMARY

According to one embodiment, a system includes memory and a microcontroller including an analog-to-digital converter (ADC) and in communication with the memory. The microcontroller is configured to define a fingerprint that includes a baseline measurement of side-channel traces of a side-channel of a separate processor retrieved from the ADC, during an enrollment period of the system, wherein the enrollment period includes measuring a voltage of the separate processor and generating a fingerprint prior to runtime operation, receive a runtime measurement from the ADC regarding the voltage of at least the separate processor during runtime, compare the runtime measurement to the fingerprint, and in response to the measurement exceeding a threshold, executing a countermeasure operation against software ran by the separate processor.

According to one embodiment, a computer-implement method includes defining a fingerprint that includes a baseline measurement retrieved from a side-channel of at least a separate processor during an enrollment period of the system, wherein the baseline measurement includes one or more physical attributes received from an analog-to-digital converter (ADC) of a microcontroller, receiving a runtime measurement from the ADC, wherein the runtime measurement includes the one or more physical attributes of at least the separate processor during runtime, comparing the runtime measurement of the physical attribute to the fingerprint, and in response to the runtime measurement exceeding a threshold, executing a countermeasure operation against software ran by the separate processor.

According to one embodiment, a system that includes memory and a microcontroller including an analog-to-digital converter (ADC) and in communication with the memory. The microcontroller is configured to define a fingerprint that includes a baseline measurement of side-channel traces of a side-channel retrieved from the ADC, during an enrollment period of the system, wherein the enrollment period includes measuring voltage prior to runtime operation, receive a runtime measurement from the ADC that includes voltage of at least the separate microcontroller during runtime, compare the runtime measurement to the fingerprint, and in response to the measurement exceeding a threshold, executing a countermeasure operation against software ran by the separate processor.

DETAILED DESCRIPTION

Figure 1:
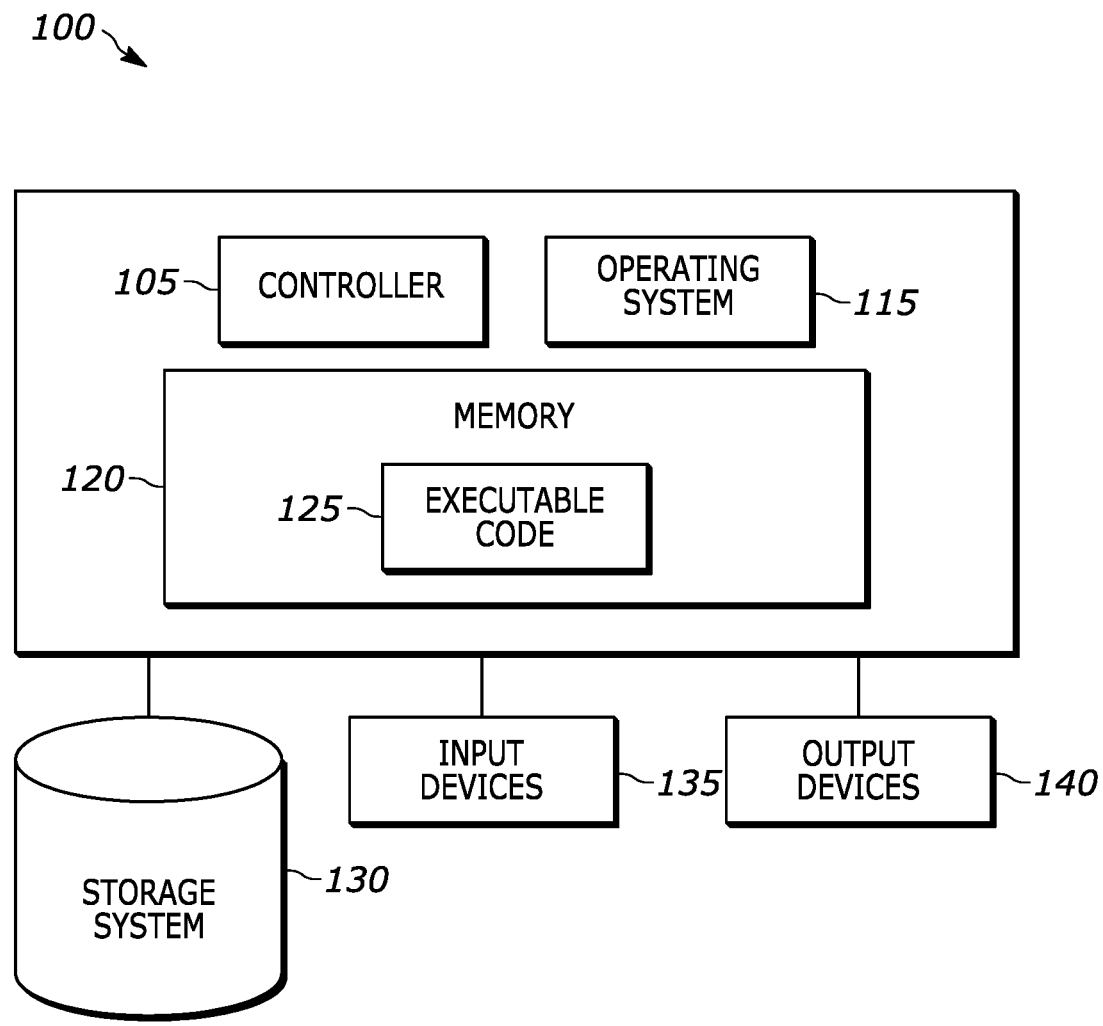
FIG. 1 illustrates a block diagram of an exemplary computing device, according to some embodiments of the disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The illustrative embodiment introduces a system and method to detect malicious attacks. A physical property of a device or electronic control unit (ECU) connected to an in-vehicle bus may constantly be measured. Due to their enhanced connectivity with internal and external networks, modern automotive Microcontroller Unit (MCUs) can be subject to malicious attacks by software, hardware, or parameter modification. In the automotive world, such attacks, even for a short period of time, can be severe and thus run-time detection of these attacks may be vital to the automotive safety and security.

In this disclosure, an embodiment describes a technique that can improve the quality of techniques that attempt to mitigate such attacks. This family of countermeasures is—depending on the implementation—able to work without software or hardware modifications of the existing devices. In one potential embodiment, only external wires are needed to measure the power consumption of the MCU under consideration. Useful signatures are then extracted from these real-time measurements and then compared with reference signatures calculated beforehand from training measurements taken during a profiling stage. During the profiling stage, only valid programs are run to build a database of their individual signatures (i.e. fingerprints). Any different or modified programs—not profiled in the database—should ideally have different characteristics and thus generate different signatures. Therefore, by constantly monitoring the MCU under test, the system can perform a low-level physical run-time intrusion detection by comparing these signatures.

Many MCUs have integrated on-chip Analog to Digital Converters (ADCs). The integrated ADCs may be utilized in the Intrusion Detection System (IDS). The ADCs offer a low-cost solution to obtain a physical measurement, which can also be used to generate a fingerprint. Many modern MCUs include a lot of (potentially unused) ADC inputs, thus it may be an inexpensive task and solution to utilize the ADC for an IDS. While many of the modern MCUs provide on-chip ADCs, many of the ADC inputs are not utilized. The unused resources could be utilized as a cheap low-level IDS. The measurements may be collected very locally, which may help reduce sources of noise and other interference. Alternatively, the measurements maybe sent to a different device on the same vehicle (e.g., a central automotive gateway), for processing and detection. Another alternative might be to send the measurements to a remote device (a remote computer or server not in the vehicle) for further processing and detection.

As shown in FIG. 1, which shows a block diagram of an exemplary computing device, according to some embodiments of the disclosure. A device 100 may include a controller 105 that may be, for example, a central processing unit processor (CPU), a chip or any suitable computing or computational device, an operating system 115, a memory 120, executable code 125, a storage system 130 that may include input devices 135 and output devices 140. Controller 105 (or one or more controllers or processors, possibly across multiple units or devices) may be configured to carry out methods described herein, and/or to execute or act as the various modules, units, etc. More than one computing device 100 may be included in, and one or more computing devices 100 may act as the components of, a system according to embodiments of the invention.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or tasks or enabling software programs or other modules or units to communicate. Operating system 115 may be a commercial operating system. It will be noted that an operating system 115 may be an optional component, e.g., in some embodiments, a system may include a computing device that does not require or include an operating system 115. For example, a computer system may be, or may include, a microcontroller, an application specific circuit (ASIC), a field programmable array (FPGA), network controller (e.g., CAN bus controller), associated transceiver, system on a chip (SOC), and/or any combination thereof that may be used with or without an operating system or real-time operating system (RTOS).

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that enforces security in a vehicle as further described herein, for example, detects or prevents cyber-attacks on in-vehicle networks. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. Where applicable, the terms "process" and "executable code" may mean the same thing and may be used interchangeably herein. For example, verification, validation and/or authentication of a process may mean verification, validation and/or authentication of executable code.

Storage system 130 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, memory 120 may be a nonvolatile memory having the storage capacity of storage system 130. Accordingly, although shown as a separate component, storage system 130 may be embedded or included in memory 120.

Input devices 135 may be or may include any suitable input devices, components or systems, e.g., physical sensors such as accelerometers, tachometers, thermometers, microphones, analog to digital converters, etc., a detachable keyboard or keypad, a mouse and the like. Output devices 140 may include one or more (possibly detachable) displays or monitors, motors, servo motors, speakers and/or any other suitable output devices. Any applicable input/output (I/O) devices may be connected to computing device 100 as shown by blocks 135 and 140. For example, a wired or wireless network interface card (NIC), a universal serial bus (USB) device, JTAG interface, or external hard drive may be included in input devices 135 and/or output devices 140. It will be recognized that any suitable number of input devices 135 and output device 140 may be operatively connected to computing device 100 as shown by blocks 135 and 140. For example, input devices 135 and output devices 140 may be used by a technician or engineer in order to connect to a computing device 100, update software and the like. Input and/or output devices or components 135 and 140 may be adapted to interface or communicate, with control or other units in a vehicle, e.g., input and/or output devices or components 135 and 140 may include ports that enable device 100 to communicate with an engine control unit, a suspension control unit, a traction control and the like.

Embodiments may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 120, computer-executable instructions such as executable code 125 and a controller such as controller 105.

The storage medium may include, but is not limited to, any type of disk including magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

Embodiments of the invention may include components such as, but not limited to, a plurality of central processing units (CPU), graphic processing units (GPU) or any other suitable multi-purpose or specific processors or controllers (e.g., controllers similar to controller 105), hardware security modules (HSMs), a plurality of input units, a plurality of output units, a plurality of memory units, and a plurality of storage units. For brevity, while the disclosure below may refer to a CPU, the reference to a CPU or CPUs may be interpreted to include GPUs, controllers, processors, microprocessors, microcontrollers, FPGAs, SOCs, HSMs, or other components. A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device.

In some embodiments, a system may include or may be, for example, a plurality of components that include a respective plurality of central processing units, e.g., a plurality of CPUs as described, a plurality of CPUs embedded in an on board, or in-vehicle, system or network, a plurality of chips, FPGAs or SOCs, microprocessors, HSMs, transceivers, microcontrollers, a plurality of computer or network devices, GPUs, any other suitable computing device, and/or any combination thereof. For example, a system as described herein may include one or more devices such as computing device 100.

Figure 2:
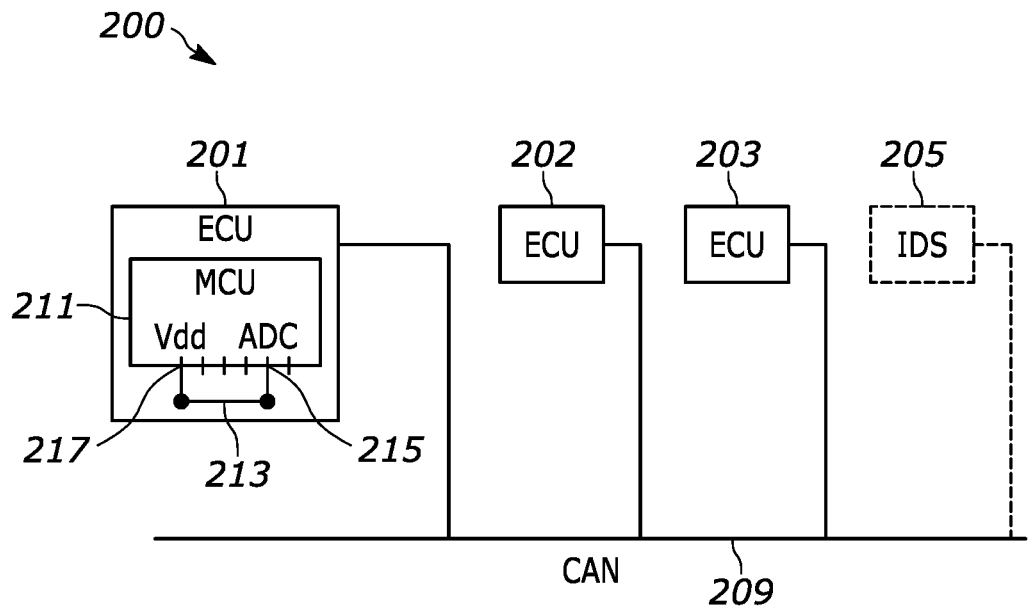
FIG. 2 illustrates an exemplary block diagram of a computing device utilizing an MCU with an ADC.

FIG. 2 illustrates an exemplary block diagram of a computing device utilizing an MCU with an ADC. The circuit 200 may include a first ECU 201, second ECU 202, third ECU 203, an intrusion detection system (IDS) 205, as well as an ADC 215 that may be an on-chip ADC 215 incorporated into the MCU 211. The circuit may connect each of these components by a CAN bus 209. The CAN bus 209 may be utilized to allow various ECUs or controllers in the vehicle to communicate with one another. The IDS 205 may be utilized to store a fingerprint and other secure data related to the system, in one alternative. The fingerprint may be used as a profile of the ECU or circuit and be utilized by the IDS to detect malicious behavior. While multiple ECUs are shown in circuit 200, alternative embodiments may include more or less ECUs that are utilized.

The IDS 205 may be utilized to store a fingerprint based on measurements during a training phase of the system. In another embodiment, the IDS may be utilized to draw measurements from the first ECU 201 that is connected to the ADC 205 or another type of sensor or probe. In one embodiment, an option IDS 205 may thus make the determination of whether an anomaly has occurred that requires a countermeasure to be executed. The countermeasure may include shutting down operation of certain software, terminating power to one or more components, informing a remote system of a potential anomaly or issue, outputting information to a user of such an anomaly to allow appropriate response, raising an alarm, etc. The fingerprint may be code that is utilized to identify normal operation of the system by utilizing one or more measurements of voltage or other physical attributes (e.g., parasitic noise) from the ADC 215 one or more ECUs of the system. The measurements may be derived from a sensor that can be utilized to identify physical attributes of the ECUs or the system. For example, the system may utilize a sensor such as a microphone, accelerometer, gyroscope, thermal component (thermistor), thermometers, or any other similar internal or external sensors, etc. For example, the system may derive a fingerprint from utilizing a physical measurement of current or voltage from an ADC 215 connected to an ECU, as well as a temperature of the ECU. To perform the actual measurement and transform that measurement it to a digital value that can be analyzed, the system may utilize an analog-to-digital converter (ADC) 215. Such an embedded ADC 215 may be available in a microcontroller.

The training phase may also be called a profiling phase or baseline phase. The intrusion detection system may utilize voltage measurements taken by the ADC, or other physical measurements to fingerprint software running on an integrated circuit, as disclosed in application Ser. No. 16/723,861, filed on Dec. 20, 2019, and entitled "A SYSTEM AND METHOD FOR NETWORK INTRUSION DETECTION BASED ON PHYSICAL MEASUREMENTS", which is hereby incorporated by reference in its entirety. The intrusion detection system may work in two phases, an enrollment phase (e.g., training phase) and a runtime phase. In the enrollment phase, the ADC may perform a device measurement to read voltage from the microcontroller. In alternative embodiments, an external or internal sensor performs a device measurement of a physical property (e.g. power, timing, sound, temperature, vibration, etc.) to perform an initial baseline measurement. This measurement may be used to derive a fingerprint using, e.g., machine learning (ML)/deep learning (DL) techniques, signal processing techniques or a combination thereof. A possible variation includes an enrollment process which includes protection of the model in a secure part of the processor hosting the IDS. It could be protected using, for example, a secure processor or secure memory or both.

In an alternative embodiment, the measurements could be transmitted to a gateway or network IDS that is remote from the circuit. The remote IDS may then take measurements of the circuit and do the comparisons. The network transmission could be correlated with the processing by sending a signature of the processing after the transmission of critical messages. The transmission of an injected message would ideally have a different signature since there wouldn't be processing involved. Remote attestation capabilities may also be added to allow the network IDS to send challenges that trigger a special sequence of functions or instructions which result in a finger print (resulting from measurements of power consumption, timings, sound, temperature, vibration, or other physical attributes, etc.). The fingerprints may be sent to a verifier (which can be a protected area of the same device, a different local device, or a remote device or cloud service) where the fingerprints are verified. The fingerprints may be derived from a physical measurement can also be used to define a context (e.g., a specific situation in which the device is running, such as driving slowly, driving fast, stopped, etc.) The context may be utilized in turn to be used to specify rules (e.g., how to respond) by the IDS.

During the run-time of the device, side-channel power measurements can be done at a specific time window. These measurements may be then processed in the same way as during the enrollment phase and compared to the baseline.

If the fingerprint doesn't match the expected fingerprint of that function (within a defined threshold), it has to be assumed that the function was—potentially maliciously—modified. The intrusion can be logged and further actions can be triggered, e.g., kill/delay/modify a process/message/connection, disable/reboot device, reprogram device with original code, or resetting the device.

As shown in FIG. 2, instead of relying on an external physical sensor, the MCU's internal ADC 215 may be used to collect the side-channel traces. The static and dynamic power consumption of the MCU correlates with the instructions that are running on the MCU. The constantly changing power consumption may also lead to a changing load on the supply voltage rail. This may lead to slight deviations from the ideal voltage (e.g. 1.2 V). These deviations can therefore also be correlated with the instructions that are running on the microcontroller. The ADC may be used to record these deviations. The recorded traces can then be used for enrollment and runtime fingerprinting. The power-supply pin 217 may be connected to the ADC via a connection 213 to record the various traces and possible change in power consumption.

The ADC 215 may have two sets of voltage sources. One of the power supplies may provide power to the ADC, and one of them may provide the reference signal. The reference power supply usually provides power to the analog portion of the ADC, and it is assumed to be noise free (or at least a very clean signal). The ADC may also have multiple channels that can be configured via configuration registers. Such registers can typically be configured from the microcontroller and often do not have any access control (i.e. any application can set them). Typically, the output channels may be received in output registers, which may also be readable by any application. The registers may not have confidentiality or integrity in their data for such registers according to an embodiment in this disclosure.

The power supply pin 217 may be connected to the MCU's 211 internal voltage pin via a connection pin 213 or other type of connection. The ADC can subsequently be used to monitor the physical behavior of the MCU 211, fingerprint benign behavior, and detect malicious (or random) modifications. More ECUs could be equipped with such measurement abilities. The measurement results may also be sent to a separate IDS to perform the comparison.

Additional alternative embodiments are shown and described below in the various figures. In one example, the measurement from the ADC could also be transmitted to a different source, such as a gateway or network IDS that may run the comparison of the signature with the runtime measurement. Thus, the measurement from the IDC is transmitted to another processor, controller, or component. The ADC may utilize a specific channel for the IDS. For example, the channel may include a higher bandwidth than the other (standard channels) and a much higher sampling rate. The comparison may include a distance measure between the baseline and the measurement (e.g., runtime measurement) according to a pre-defined distance (e.g., correlation, Euclidean distance, L1-distance, etc.), comparing the resulting distance to a threshold, etc. In yet another embodiment, after the measurement of the physical attribute there may be a post-processing step of the measured signal. The post-processing of the signal, which may include, the signal itself, a filtered version of the signal, some derived features of the signal via signal processing or possibly through a neural network, etc. The system may also include a process of alignment of the measured signal with respect to a baseline signal.

The comparison between the signature and the runtime measurement may be done through a neural network or other type of machine learning system. The comparison output may be a tupple of accuracy and confidence values that may be use to compare and to define a threshold defined baseline for a training process. Thus, the network may be trained in response to the confidence values and amount of loss from a prediction. It might be good to also add a dependent claim where the comparison is done through a neural network and the comparison output is a tuple of accuracy and confidence values and both of these are compared to a defined (appropriate) threshold defined during the baseline (training process).

The network transmission could be correlated with the processing by sending a signature of the processing after the transmission of critical messages. The transmission of an injected message would ideally have a different signature since there wouldn't be processing involved.

Remote attestation capabilities could be added, which would allow the network IDS to send challenges that trigger a special sequence of functions or instructions which result in a fingerprint (resulting from measurements of power consumption, timing, sound, temperature, vibration, etc.). These fingerprints are sent to a verifier (this can be a protected area of the same device, a different local device, or a remote device or cloud service) where the fingerprints are verified.

The fingerprints derived from physical measurements can also be used to define a context (a specific situation in which the device is running, such as for example, slow driving, fast driving, stopped). This context can in turn be used to specify rules (ways in which to respond) by the IDS.

The ADC may also include a special security register or multiple registers. Such registers could be accessible to a secure element (e.g., an HSM) inside the microcontroller or only available after an initial secret configuration. Only if the HSM (or the expected secret is present) enables the security register, the "IDS" channel would be available for reading. An alternative use of the security register once it has been enabled is to allow encryption or Message Authentication Code (MAC) computation fully integrated inside the ADC. The system may also allow challenges to be accepted during the IDS operation. Receiving and acceptance of such challenges could be enabled in a challenge register inside the ADC. There may be a corresponding response register. The output of the register could be input to any encryption or MAC unit to enable encryption and/or integrity protection of the ADC response. The encryption/integrity unit is part of the ADC, as opposed to a separate component.

The ADC may be connected via at least one data bus to the main microcontroller CPU. An IDS ADC, which has at least one channel connected via a secure bus, may also be utilized. The secure bus may mean that it is encrypted and/or authenticated. The bus may be controlled by the secure element (e.g., HSM) or by accessing a secure state of the microcontroller. The system may use a key (e.g., public key/private key) utilized to encrypt or authenticate via any secure protocol. Thus, the data bus may include AND-logical behavior, similar to a CAN bus.

Figure 3A:
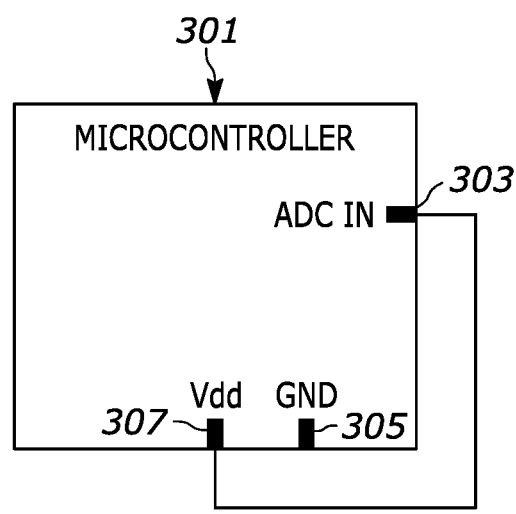
FIG. 3A illustrates a first embodiment of a configuration of an IDS using an ADC.

FIG. 3A illustrates a first embodiment of a configuration of an IDS using an ADC. The system of FIG. 3A may probe the internal voltage of the controller directly in this embodiment. The MCU 301 may include an internal ADC. The ADC may include a voltage input pin 303 that is connected to the power supply pin 307. The power supply pin 307 may be the positive supply voltage, in one embodiment. Notably, the ground connection 305 may not be connected to the input pin 303 of the ADC. In such a configuration, only one channel of the ADC's multiple channels may be connected to Vdd via an internal chip connection. The connection may be designed so as to minimize the amount of noise by using a low pass filter (e.g., Resistor-Capacitor circuit), which may be carefully designed to the characteristics of the Vdd signal. For example, to allow fast charging and discharging of the low pass filter.

Figure 3B:
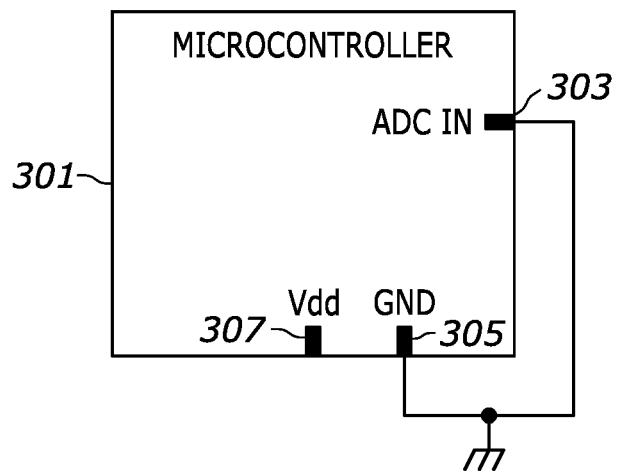
FIG. 3B illustrates a second embodiment of a configuration of an IDS using an ADC.

FIG. 3B illustrates a second embodiment of a configuration of an IDS using an ADC. The probing may be conducted of the ground pin of the microcontroller 301 in this embodiment. The MCU 301 may include an internal ADC. The ADC may include a voltage input pin 303 that is connected to the ground connection 305. The power supply pin 307 may be the positive supply voltage, in one embodiment. Notably, the power supply pin 307 may not be connected to the input pin 303 of the ADC.

Figure 3C:
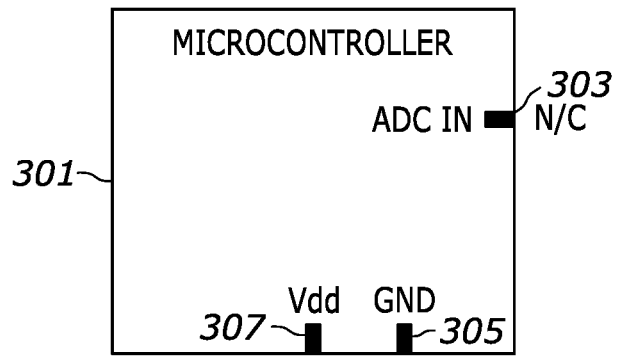
FIG. 3C illustrates a third embodiment of a configuration of an IDS using an ADC.

FIG. 3C illustrates a third embodiment of a configuration of an IDS using an ADC. The system may leave the ADC pin 303 unconnected. Thus, the ADC pin 303 may not have a connection to either the power supply pin 307 or the ground 305. The system may then measure parasitic noise on the ADC in this embodiment.

Figure 3D:
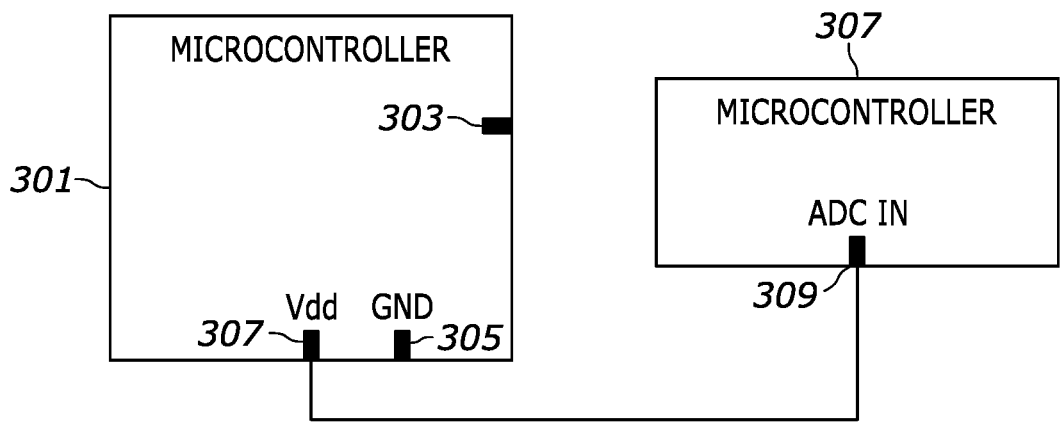
FIG. 3D illustrates a fourth embodiment of a configuration of an IDS using an ADC.

FIG. 3D illustrates a fourth embodiment of a configuration of an IDS using an ADC. The system may utilize a secondary MCU 307 with an ADC 309 to perform the measurements and probing in this embodiment. The secondary MCU 307 may be connected to the primary MCU 301 via the ADC input 309 and the power supply pin 307. The MCU 301 may thus not utilize it's own ADC. In an alternative embodiment, the system may probe the ground pin 305 rather than the power supply pin 307.

Figure 4:
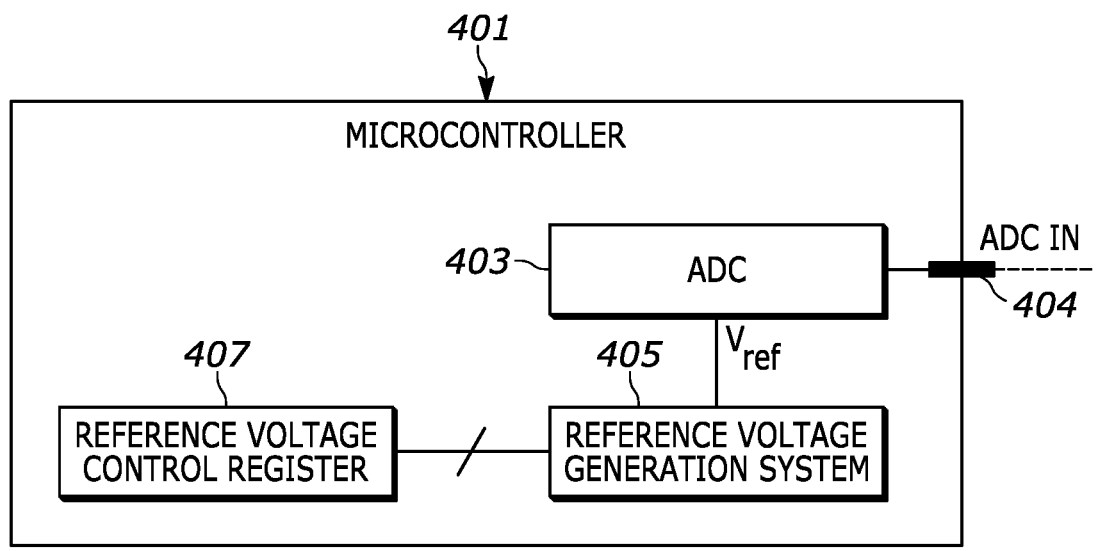
FIG. 4 illustrates a system with a variable reference voltage to the ADC.

FIG. 4 illustrates a system with a variable reference voltage to the ADC. The ADC configuration in such an embodiment may allow the ADC reference voltage is controllable by a system that can thus be configured through an internal register. The microcontroller 401 may include an ADC 403. The ADC 403 may have an input 404 utilized to retrieve an input voltage. The MCU 401 may include a reference voltage generation system 405 and a reference voltage control register 407. The system may include a reference voltage that can be controlled by an internal register, such as the reference voltage register 407. The voltage reference may produce a fixed (or constant) voltage irrespective of the loading on the microcontroller 401 or device, power supply variations, temperature changes, and the passage of time. The internal register can additionally be accessible only from the secure element (e.g. HSM) or during IDS operations. For different stages of IDS operation, the reference voltage can be varied based on the operation being inspected or the task being performed. For example, the reference voltage may be different for operating a certain application as compared to another. In case of receiving challenges, the reference level configuration can be a part of the challenge. Such a system would provide additional degrees of freedom to the challenge/attestation entity. In another scenario, the reference voltage control register can be a part of the secure element.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM or flash memory devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system comprising:
    memory;
    a microcontroller including an analog-to-digital converter (ADC) and in communication with the memory and configured to:
    define a fingerprint that includes a baseline measurement of side-channel traces of a side-channel of a separate processor retrieved from the ADC, during an enrollment period of the system, wherein the enrollment period includes measuring a voltage of the separate processor prior to runtime operation via a power supply pin of the ADC,
    wherein the ADC includes a security register that is accessible upon passing security measures;
    receive a runtime measurement from the ADC regarding the voltage of at least the separate processor during runtime, wherein the runtime measurement is retrieved directly from the power supply pin;
    compare the runtime measurement to the fingerprint to obtain a difference; and
    in response to the difference exceeding a threshold, executing a countermeasure operation against software ran by the separate processor, a hardware modification, or one or more fault-attacks, wherein the countermeasure operation is associated with a context defined by the runtime measurement from the ADC.

2. The system of claim 1, wherein the countermeasure includes outputting a message or a notification.

3. The system of claim 1, wherein the ADC includes an ADC input pin connected to an internal voltage pin of the microcontroller, a powers supply, an internal regulator, or an intermediate voltage.

4. The system of claim 1, wherein the ADC includes an encryption unit that receives output via security register.

5. The system of claim 4, wherein the ADC includes an ADC input pin connected to an internal voltage pin of the microcontroller to measure drain power voltage.

6. The system of claim 1, wherein a channel of the side-channel includes a higher bandwidth than other channels of the side-channel, wherein the channel is utilized for the baseline measurement.

7. The system of claim 1, wherein the ADC is connected via a least one data bus to the separate processor, wherein the ADC includes at least one channel connected via a secure bus that requires encryption or authentication or both.

8. The system of claim 1, wherein a channel of the side-channel includes a higher sampling rate than other channels of the side-channel of the ADC, wherein the channel is utilized for the baseline measurement.

9. A computer-implement method, comprising:
defining a fingerprint that includes a baseline measurement retrieved from a side-channel of at least a separate processor during an enrollment period, wherein the baseline measurement includes one or more physical attributes received from an analog-to-digital converter (ADC) of a microcontroller, wherein the ADC includes a security register that is accessible upon passing security measures;
receiving a runtime measurement from the ADC, wherein the runtime measurement includes the one or more physical attributes of at least the separate processor during runtime, wherein the runtime measurement is retrieved directly from a power supply pin of the ADC;
comparing the runtime measurement of the physical attribute to the fingerprint to obtain a difference; and
in response to the difference exceeding a threshold, executing a countermeasure operation against software ran by the separate processor, a hardware modification, or one or more fault-attacks, wherein the countermeasure operation is associated with a context defined by the runtime measurement from the ADC.

10. The computer-implemented method of claim 9, wherein the physical attribute includes a voltage.

11. A system comprising:
memory;
a microcontroller including an analog-to-digital converter (ADC) and in communication with the memory and configured to:
define a fingerprint that includes a baseline measurement of side-channel traces of a side-channel retrieved from the ADC, during an enrollment period of the system, wherein the enrollment period includes measuring voltage prior to runtime operation, wherein the ADC includes a security register accessible upon passing security measures;
receive a runtime measurement from the ADC that includes voltage of at least a separate microcontroller during runtime, wherein the runtime measurement is retrieved from a power supply pin of the ADC;
compare the runtime measurement to the fingerprint to obtain a difference; and
in response to the difference exceeding a threshold, executing a countermeasure operation against software ran by the separate processor, a hardware modification, or one or more fault-attacks.

12. The system of claim 11, wherein the runtime measurement is retrieved from a connection between an input supply pin of the ADC and a voltage supply of the microcontroller.

13. The system of claim 11, wherein the runtime measurement is retrieved from a connection between an input supply pin of the ADC and a ground of the microcontroller.

14. The system of claim 11, wherein the runtime measurement is retrieved from no connection with an input supply pin of the ADC, wherein the runtime measurement includes parasitic noise of the ADC.

15. The system of claim 11, wherein the countermeasure operation includes reprogramming the software to original code.

16. The system of claim 11, wherein the countermeasure operation includes reprogramming the software.

17. The system of claim 11, wherein the side-channel is associated with a separate microcontroller.

18. The system of claim 11, wherein runtime measurement is sent to an intrusion detection system (IDS) segregated from the separate processor and MCU, wherein the IDS is configured to compare the runtime measurement to the baseline measurement utilizing a neural network, wherein the IDS is further configured to access a security register of the MCU during operation of the IDS.

19. The system of claim 1, wherein the microcontroller includes a reference voltage control register configured to control a reference voltage of the system.

20. The system of claim 19, wherein the reference voltage control register is accessible only by a secure element or during a system operation.

* * * * *